(12) United States Patent
Duffee-Braun et al.

(10) Patent No.: US 11,263,070 B2
(45) Date of Patent: *Mar. 1, 2022

(54) GENERATING TARGETED ANALYSIS RESULTS IN A SUPPORT SYSTEM

(71) Applicant: Red Hat, Inc., Raleigh, NC (US)

(72) Inventors: Wesley H. Duffee-Braun, Nashville, TN (US); Jonathan F. Newton, Raleigh, NC (US); Jesse H. Jaggars, Little Rock, AR (US)

(73) Assignee: Red Hat, Inc., Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/428,528

(22) Filed: May 31, 2019

(65) Prior Publication Data

US 2019/0286508 A1   Sep. 19, 2019

Related U.S. Application Data

(63) Continuation of application No. 15/440,585, filed on Feb. 23, 2017, now Pat. No. 10,360,094.

(51) Int. Cl.
*G06F 11/07* (2006.01)

(52) U.S. Cl.
CPC ........ *G06F 11/079* (2013.01); *G06F 11/0709* (2013.01); *G06F 11/0781* (2013.01); *G06F 2201/805* (2013.01)

(58) Field of Classification Search
CPC ............ G06F 2201/805; G06F 11/079; G06F 11/0709; G06F 11/0781; G06F 11/0766; G06F 9/542; G06F 16/35; G06F 16/3344; G06F 16/335; G06F 16/248; G06F 16/2456; G06N 5/047

See application file for complete search history.

(56) References Cited

U.S. PATENT DOCUMENTS 6,658,598 B1    12/2003  Sullivan
7,171,651 B1 *   1/2007  Greenberg .............. G06F 9/542
                                                714/E11.207

(Continued)

OTHER PUBLICATIONS

Doulkeridis, C., Nørväg, K. A survey of large-scale analytical query processing in MapReduce. The VLDB Journal 23, 355-380 (2014). https://doi.org/10.1007/s00778-013-0319-9 (Year: 2014).*

(Continued)

*Primary Examiner* — Yolanda L Wilson
(74) *Attorney, Agent, or Firm* — Withrow & Terranova, PLLC

(57) ABSTRACT

Generating targeted analysis results in a support system is disclosed. Computing device information about a supported computing device in which a problem was encountered is received. Identification of a designated subset of tags of a plurality of tags is received. A plurality of analyzers is initiated to analyze the computing device information. The plurality of analyzers is configured to generate a plurality of results based on the computing device information. Tags of the plurality of tags are associated with the plurality of results. A subset of results are generated by discarding each result from the plurality of results that have no associated tags that match a tag in the designated subset of tags. The subset of results is output.

16 Claims, 5 Drawing Sheets

(56) References Cited

U.S. PATENT DOCUMENTS

| | | | |
|---|---|---|---|
| 7,934,261 B1* | 4/2011 | Saguiguit | G06F 21/565 726/24 |
| 9,104,573 B1* | 8/2015 | Shanmugasundaram | G06F 11/079 |
| 9,274,874 B1 | 3/2016 | Chamness et al. | |
| 9,378,270 B2 | 6/2016 | Sekar | |
| 2003/0167406 A1* | 9/2003 | Beavers | G06F 11/0709 726/22 |
| 2009/0019310 A1* | 1/2009 | Nastacio | G06F 11/079 714/26 |
| 2010/0299678 A1* | 11/2010 | Taylor | G06F 9/542 719/318 |
| 2012/0222097 A1 | 8/2012 | Wilson et al. | |
| 2013/0218640 A1 | 8/2013 | Kidder et al. | |
| 2014/0188779 A1* | 7/2014 | Sakuraba | G05B 23/0275 706/52 |
| 2015/0355888 A1 | 12/2015 | Shani et al. | |
| 2015/0356405 A1 | 12/2015 | Sanchez et al. | |
| 2016/0070629 A1* | 3/2016 | Basile | G06F 11/221 235/375 |
| 2016/0148111 A1* | 5/2016 | Miyata | G06Q 10/067 706/48 |
| 2017/0011302 A1* | 1/2017 | Heckman | G06F 11/079 |
| 2017/0031969 A1* | 2/2017 | Smits | G06F 16/13 |
| 2017/0180187 A1* | 6/2017 | Whitner | H04L 41/069 |

OTHER PUBLICATIONS

Author Unknown, "Civitas Learning Upgrades Flagship Product Illume, Simplifies Data-Informed Decision-Making for Colleges and Universities," Civitas Learning, Sep. 22, 2016, 2 pages.

Author Unknown, "Enterprise scalability coupled with the best business intelligence architecture," GoodData Corporation, available at least as early as Jan. 3, 2017, 4 pages, www.gooddata.com/platform/scalable-distribution.

Author Unknown, "Technical Support Policies and Procedures: Guidelines for interacting with MicroStrategy Technical Support," MicroStrategy Incorporated, Oct. 2016, 20 pages.

Non-Final Office Action for U.S. Appl. No. 15/440,585, dated Sep. 10, 2018, 7 pages.

Notice of Allowance for U.S. Appl. No. 15/440,585, dated Mar. 11, 2019, 8 pages.

* cited by examiner

GENERATING TARGETED ANALYSIS RESULTS IN A SUPPORT SYSTEM

RELATED APPLICATION

This application is a continuation of co-pending U.S. patent application Ser. No. 15/440,585 filed on Feb. 23, 2017, entitled "GENERATING TARGETED ANALYSIS RESULTS IN A SUPPORT SYSTEM," which is hereby incorporated herein by reference in its entirety.

TECHNICAL FIELD

The examples relate generally to analyzing problems in computing devices and, in particular, to generating targeted analysis results in a support system.

BACKGROUND

A runtime computing device environment can have hundreds or thousands of different configuration options, and can run a complex mix of applications, operating systems, middleware systems, and/or other processes. If the runtime computing device environment encounters a problem, a vendor of software running in the runtime computing device environment may be requested to determine what the problem is, and to correct the problem.

SUMMARY

The disclosed examples facilitate the resolution of problems encountered in computing environments. The examples allow the designation of a subset of tags that can be used to filter results of an analysis engine. Results that do not have associated tags that match a tag in the subset of tags are discarded, leaving only results that relate to the designated tags. The examples facilitate targeted analysis results to aid in the resolution of problems encountered in computing environments.

In one example a method is provided. The method includes receiving, by a computing device comprising a processor device, computing device information about a supported computing device in which a problem was encountered. The method further includes receiving identification of a designated subset of tags of a plurality of tags. The method further includes initiating a plurality of analyzers to analyze the computing device information, the plurality of analyzers configured to generate a plurality of results based on the computing device information. The method further includes associating tags of the plurality of tags with the plurality of results. The method further includes generating a subset of results by discarding each result from the plurality of results that have no associated tags that match a tag in the designated subset of tags and includes outputting the subset of results.

In another example a computing device is provided. The computing device includes a memory and a processor device coupled to the memory. The processor device is to receive computing device information about a supported computing device in which a problem was encountered. The processor device is further to receive identification of a designated subset of tags of a plurality of tags. The processor device is further to initiate a plurality of analyzers to analyze the computing device information, the plurality of analyzers configured to generate a plurality of results based on the computing device information. The processor device is further to associate tags of the plurality of tags with the plurality of results. The processor device is further to generate a subset of results by discarding each result from the plurality of results that have no associated tags that match a tag in the designated subset of tags and is further to output the subset of results.

In another example a computer program product is provided. The computer program product is stored on a non-transitory computer-readable storage medium and includes instructions to cause a processor device to receive computing device information about a supported computing device in which a problem was encountered. The instructions further cause the processor device to receive identification of a designated subset of tags of a plurality of tags. The instructions further cause the processor device to initiate a plurality of analyzers to analyze the computing device information. The plurality of analyzers are configured to generate a plurality of results based on the computing device information. The instructions further cause the processor device to associate tags of the plurality of tags with the plurality of results. The instructions further cause the processor device to generate a subset of results by discarding each result from the plurality of results that have no associated tags that match a tag in the designated subset of tags and cause the processor device to output the subset of results.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

DETAILED DESCRIPTION

Figure 1:
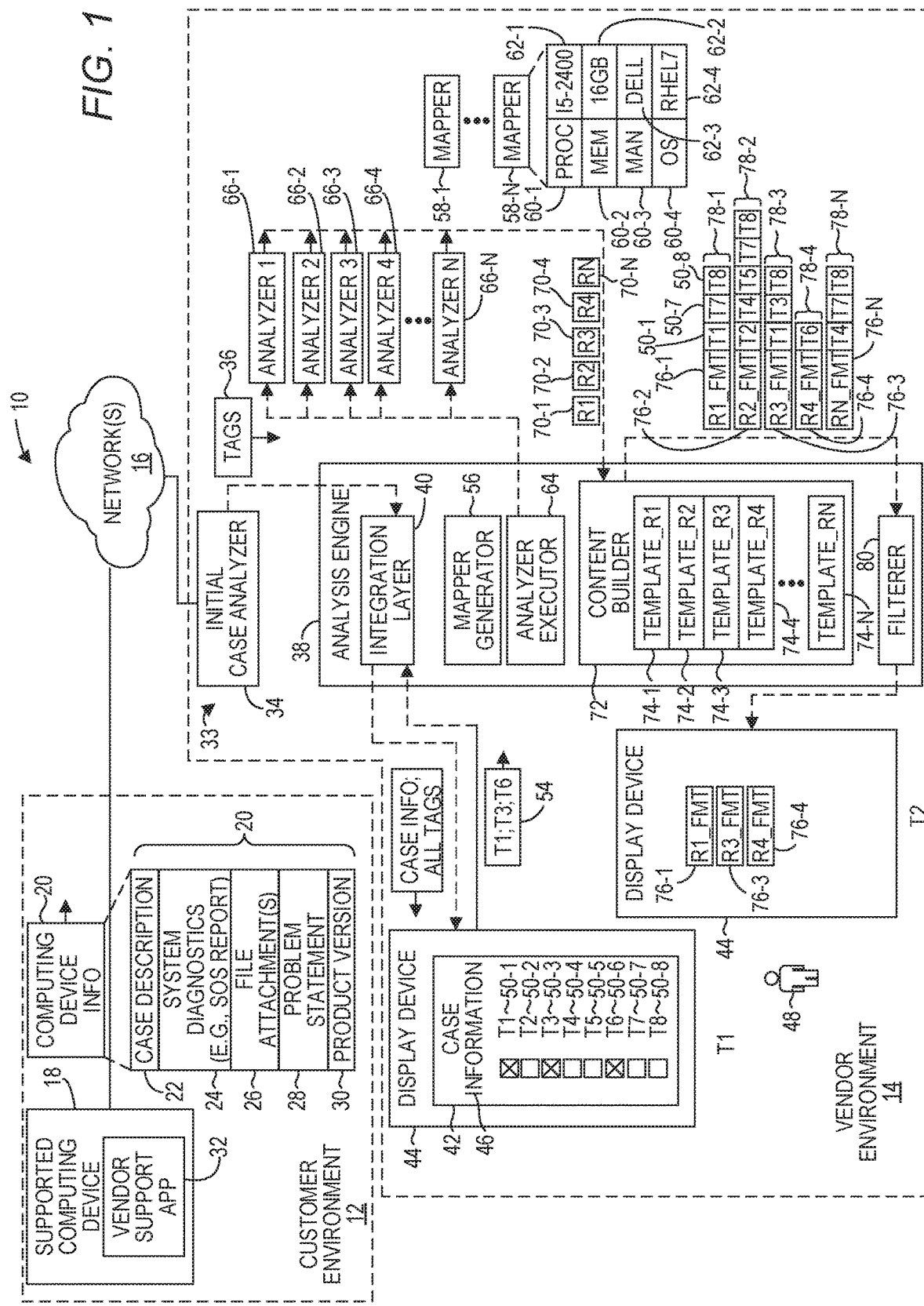
FIG. 1 is a block diagram of an environment in which examples may be practiced.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first result" and "second result," and does not imply a priority, a type, an importance, or other attribute, unless otherwise stated herein. As used herein and in the claims, the articles "a" and "an" in reference to an element refers to "one or more" of the element unless otherwise explicitly specified.

A runtime computing device environment can have hundreds or thousands of different configuration options, and can run a complex mix of application, operating system, middleware, and/or other processes. If the runtime computing device environment encounters a problem, a vendor of software running in the runtime computing device environment may be requested to determine what the problem is, and to correct the problem.

Because of the wide variety of differences in computing device environments, the types of processes running in computing device environments, the different versions of processes running in computing device environments, and the hundreds or thousands of other potential differences between computing device environments, vendors can spend a substantial amount of time identifying the cause of a problem. This can be costly and can result in a substantial delay between being notified of a problem by a customer and identifying the cause of the problem. This delay can lead to customer dissatisfaction.

Consequently, over time, vendors often build up a knowledge store of information relating to past problems encountered by customers to aid technical support engineers (TSEs) in identifying and resolving future problems encountered by a computing device of a customer. When attempting to resolve a problem, this knowledge store may be analyzed by a TSE to determine whether similar or identical problems have been previously encountered and resolved. A vendor, based on previously identified problems in other computing device environments, may implement mechanisms that automatically analyze information obtained from a customer's computing device environment and that generate results based on the analysis. However, as more and more problems are identified, such systems can generate a large quantity of results, few of which may be relevant to the problem encountered by the particular computing device. Overwhelming a TSE with tens or hundreds of analysis results that are unrelated to a problem encountered by a particular computing device environment may delay resolution of the problem rather than expedite resolution of the problem.

The disclosed examples facilitate the resolution of problems encountered in computing environments. The examples allow the designation of a subset of tags that can be used to filter results of an analysis engine. Results that do not have associated tags that match a tag in the subset of tags are discarded, leaving only results that relate to the designated tags. The examples facilitate targeted analysis results to aid in the resolution of problems encountered in computing environments.

FIG. 1 is a functional block diagram of an environment 10 in which examples may be practiced. The environment 10 includes a customer environment 12 and a vendor environment 14. While for purposes of illustration the examples are discussed in the context of vendor-customer environments, the examples are not limited to such environments, and have applicability in any environment that involves the identification of problems in computing environments. Computing devices in the customer environment 12 and the vendor environment 14 may communicate with one another via one or more networks 16.

A supported computing device 18 in the customer environment 12 encounters a problem. The problem can comprise any malfunction associated with the hardware or software of the supported computing device 18. In response to the problem, the customer generates computing device information 20 for use by the vendor to determine the cause of the problem and the solution to the problem. The computing device information 20 includes information about the problem and information about the supported computing device 18 that may facilitate the analysis of the problem by the vendor. In one example, the computing device information 20 may include a case description 22 that provides a brief description of the problem. The computing device information 20 may also include system diagnostics 24 that contain diagnostic information about the supported computing device 18, such as, by way of non-limiting example, the hardware configuration, the software configuration, and the operational state of the supported computing device 18. In a Linux computing environment, the system diagnostics 24 may be generated by running a SOS report on the supported computing device 18. The computing device information 20 may also include one or more file attachments 26 that the customer deemed to be related to the problem and that the customer deemed to be potentially useful in analyzing the problem. The computing device information 20 may also include a problem statement 28 that describes the problem from the customer's viewpoint. The computing device information 20 may also include a product version 30 that identifies the product that encountered the problem, and the version of the product.

In some examples, the computing device information 20 may be assembled, or generated, via a vendor support application 32 that executes on the supported computing device 18, or another computing device in the customer environment 12. The vendor support application 32 may request certain information from the customer and may request that the customer run one or more processes to obtain certain information about the supported computing device 18. The vendor support application 32 may also automatically run one or more processes to obtain certain information about the supported computing device 18. The vendor support application 32 may then communicate the computing device information 20 to the vendor environment 14.

The vendor environment 14 includes a support system 33. In one example the support system 33 includes an initial case analyzer 34 that initially receives and analyzes the computing device information 20. The initial case analyzer 34 may comprise an executable process that automatically, without human involvement, parses the computing device information 20 to derive one or more tags 36 about the computing device information 20. The term "tag" as used herein refers to a set of predetermined data descriptors. A tag can be associated with data such as, in this case, the computing device information 20, in response to an entity determining that the tag describes the data. For example, the initial case analyzer 34 may associate a tag of "networking" to the computing device information 20 based on data in the computing device information 20. As another example, the initial case analyzer 34 may associate a "storage" tag, a "file system" tag, a "security" tag, or the like to the computing device information 20. In one example, the tag or tags associated with the computing device information 20 by the initial case analyzer 34 may be used to route the computing device information 20 to a particular group of TSEs.

In one example, an analysis engine 38 of the support system 33 receives the computing device information 20 and the tags 36 from the initial case analyzer 34. The analysis engine 38 includes an integration layer 40 that, at a time T1, generates a user interface 42 and causes presentation of the user interface 42 on a display device 44. The user interface 42 may include case information 46 that contains descriptive information about the computing device information 20, such as the case description 22 and/or the problem statement 28. The user interface 42 may also allow a user 48, such as a TSE, to access any of the computing device information 20 and view the computing device information 20. The user interface 42 also depicts a plurality of selectable tags 50-1-50-8 (generally, tags 50). The plurality of selectable tags 50 may comprise all predetermined tags known to the analysis engine 38. While for purposes of illustration only eight tags 50 are depicted, in practice, the plurality of selectable tags 50 may comprise tens or hundreds of different predetermined tags. The user 48 may, after a review of the case information 46, select a designated subset of tags 50-1, 50-3, and 50-6 from the plurality of tags 50, resulting in user input 54 that identifies the designated subset of tags 50-1, 50-3, and 50-6 to the integration layer 40.

In one example a mapper generator 56 generates one or more mappers 58-1-58-N (generally, mappers 58). The mappers 58 comprise a condensed version of data from the computing device information 20. A mapper 58 includes predetermined subject fields, and, if present in the computing device information 20, corresponding values for the predetermined subject fields. For example, the mapper 58-N contains a plurality of predetermined subject fields 60-1-60-4. The subject field 60-1 relates to a type of processor device of the supported computing device 18. The mapper generator 56 analyzes the computing device information 20 and determines, from the computing device information 20, that the type of processor device of the supported computing device 18 is an "I5-2400" processor device. The mapper generator 56 inserts the value "I5-2400" into a value field 62-1 that corresponds to the subject field 60-1. Similarly, the subject field 60-2 relates to an amount of memory in the supported computing device 18. The mapper generator 56 analyzes the computing device information 20 and determines, from the computing device information 20, that the amount of memory in the supported computing device 18 is 16 gigabytes. The mapper generator 56 inserts the value "16 GB" into a value field 62-2 that corresponds to the subject field 60-2. Similarly, the mapper generator 56 inserts data into value fields 62-3 and 62-4 that corresponds to subject fields 60-3 and 60-4, respectively.

The analysis engine 38 has access to a plurality of analyzers 66-1-66-N (generally, analyzers 66). Each analyzer 66 is an executable process, such as, by way of non-limiting example, a python program or script, which includes conditional logic that examines one or more value fields 62 in the mappers 58 and generates a result based on the conditional logic and the values in the one or more value fields 62. The analyzers 66 are generated based, in part, on the resolution of past problems encountered by a customer. For example, if a TSE determines that a particular problem repeatedly arises when a particular operating system version is used in conjunction with a particular network driver version, the TSE may generate an analyzer 66 that determines if the value field 62 of a subject field 60 that relates to the operating system matches the particular operating system version, and if a value field 62 of a subject field 60 that relates to the network driver version matches the particular network driver version. If both conditions are met, the analyzer 66 may generate a result indicating that a certain problem exists, or is likely to occur, in the supported computing device 18. The use of the mappers 58, among other advantages, eliminates the need for each analyzer 66 to parse through the computing device information 20 to identify relevant criteria. Instead, each analyzer 66 can relatively quickly access the appropriate value field 62 of interest and determine, based on the value of one or more value fields 62, whether a particular condition is met. While for purposes of illustration only five analyzers 66 are illustrated, over time a vendor may generate hundreds or thousands of analyzers 66 based on the resolution of hundreds or thousands of past problems.

An analyzer executor 64 initiates the plurality of analyzers 66. The analyzer executor 64 may execute the analyzers 66 consecutively or may initiate groups of analyzers 66 in parallel. Each analyzer 66 generates a corresponding result 70-1-70-N (generally, results 70) based on the conditional logic of the respective analyzer 66 and the particular value fields 62. In some examples, the analyzers 66 return the results 70 to the analyzer executor 64 via an inter-program communication mechanism, such as an application programming interface.

A content builder 72 includes, or has access to, a plurality of templates 74-1-74-N (generally, templates 74), each of which corresponds to one of the analyzers 66, and also corresponds to the result 70 generated by the corresponding analyzer 66. The content builder 72 merges the results 70-1-70-N with the corresponding templates 74-1-74-N to generate corresponding formatted results 76-1-76-N. The templates 74 include, for example, textual descriptive information that may be combined with the corresponding results 70 to provide a detailed explanation of the problem and a corresponding solution for a TSE.

Each template 74 also has one or more predetermined tags 50 associated with the template 74. The predetermined tags 50 may be associated with the template 74 during the generation of the template 74, and are based on the particular analyzer 66. For example, a template 74 that corresponds to an analyzer 66 that analyzes the operating system version and the network driver version of the supported computing device 18 may have associated predetermined tags 50 of "networking" and "operating system." The content builder 72 generates content records 78-1-78-N, each of which includes a formatted result 76 and the tags 50 that are associated with the template 74 used to generate the formatted result 76. For example, the content record 78-1 includes the formatted result 76-1 and the associated tags 50-1, 50-7, and 50-8.

A filterer 80 receives the content records 78 and generates a subset of formatted results 76-1, 76-3, and 76-4 from the plurality of formatted results 76 based on the tags 50 associated with the formatted results 76 and the designated subset of tags 50-1, 50-3, and 50-6 previously selected by the user 48. In particular, the filterer 80 discards each result 76 that has no associated tags 50 that match one of the subset of tags 50-1, 50-3, and 50-6. In this example, each of content records 78-2 and 78-N have no associated tags 50 that match one of the subset of tags 50-1, 50-3, and 50-6, and thus formatted results 76-2 and 76-N are discarded. The filterer 80 outputs the subset of formatted results 76-1, 76-3, and 76-4. In one example, the filterer 80 outputs the subset of formatted results 76-1, 76-3, and 76-4 by causing presentation of the subset of formatted results 76-1, 76-3, and 76-4 on the display device 44 at a time T2.

In this manner, the examples allow the user 48 to view only those results 70 generated by the analyzers 66 that are likely to pertain to the topics that the user 48 designated via the designated subset of tags 50-1, 50-3, and 50-6. Thus, rather than having to view hundreds of results 70 and determine which of such results 70 are likely to be pertinent, the user 48 can quickly analyze only relevant results 70 because irrelevant results 70 were discarded by the filterer 80 based on the designated subset of tags 50-1, 50-3, and 50-6.

For purposes of illustration, the support system 33 has been described in the context of functional processing components, such as the initial case analyzer 34 and the analysis engine 38, and the analysis engine 38 has been discussed in terms of additional processing components, such as the integration layer 40, the analyzer executor 64, the content builder 72, and the filterer 80. However, FIG. 1 merely illustrates one way of implementing the disclosed examples, and the examples may be implemented in any number of different ways that may involve more processing components or fewer processing components than illustrated in FIG. 1. Moreover, while not illustrated in FIG. 1 due to space limitations, the initial case analyzer 34 and the analysis engine 38 may be processing components that are implemented on one or more computing devices that include processing devices. In such examples, functionality discussed herein that is attributed to a particular processing component may be attributed to a computing device or a processing device.

Figure 2:
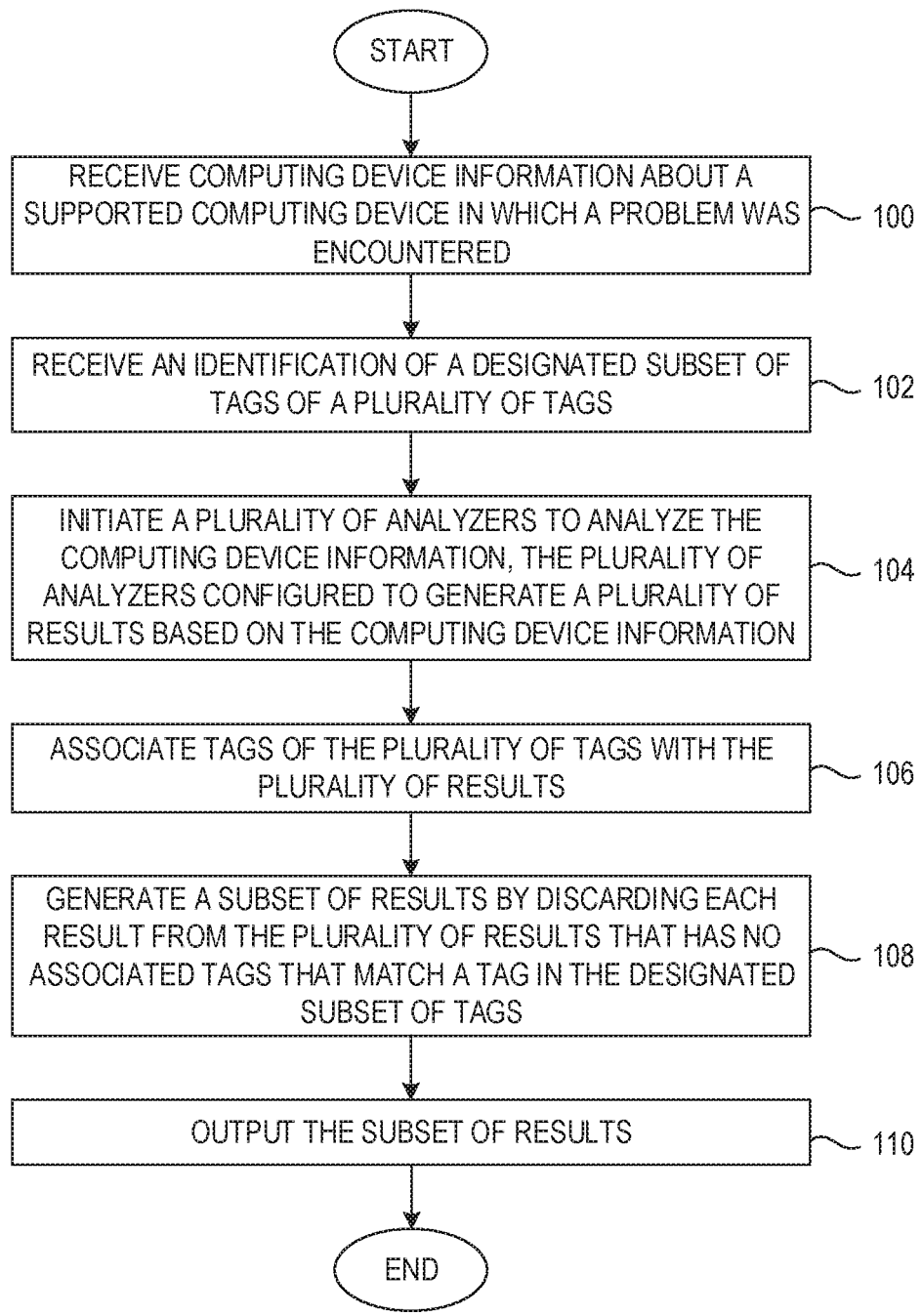
FIG. 2 is a flowchart of a method for generating targeted analysis results in a support system according to one example.

FIG. 2 is a flowchart of a method for generating targeted analysis results in the support system 33 according to one example. FIG. 2 will be discussed in conjunction with FIG. 1. The support system 33 receives the computing device information 20 about the supported computing device 18 in which a problem was encountered (FIG. 2, block 100). The support system 33 receives an identification of a designated subset of tags 50-1, 50-3, and 50-6 of the plurality of tags 50 (FIG. 2, block 102). The support system 33 initiates the plurality of analyzers 66 to analyze the computing device information 20. The plurality of analyzers 66 are configured to generate the plurality of results 70 based on the computing device information 20 (FIG. 2, block 104). The support system 33 associates tags 50 of the plurality of tags 50 with the plurality of results 70, such as via the templates 74 according to one example (FIG. 2, block 106). In other examples, the analyzers 66 may generate output records that include formatted results 70 and the associated tags 50.

The support system 33 generates the subset of results 76-1, 76-3, and 76-4 by discarding each result 76-2, 76-N from the plurality of results 76 that have no associated tags 50 that match a tag 50 in the designated subset of tags 50-1, 50-3, and 50-6 (FIG. 2, block 108). The filterer 80 outputs the subset of results 76-1, 76-3, and 76-4 (FIG. 2, block 110).

Figure 3:
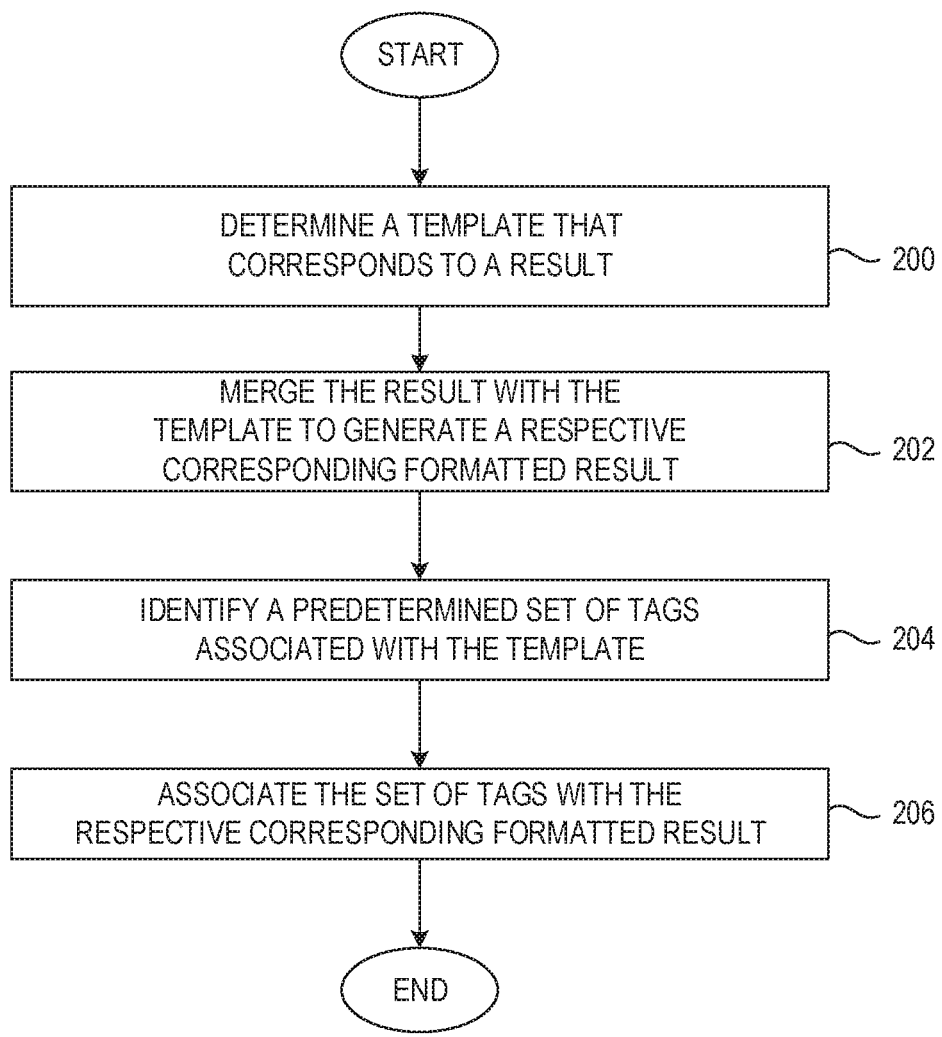
FIG. 3 is flowchart of a method for generating content records according to one example.

FIG. 3 is flowchart of a method for generating the content records 78 according to one example. FIG. 3 will be discussed in conjunction with FIG. 1. The content builder 72 receives, or otherwise obtains, the results 70 generated by the analyzers 66. For each result 70, the content builder 72 determines a template 74 that corresponds to the result 70 (FIG. 3, block 200). In one example, a cross-reference table may identify the correspondence between each analyzer 66, the results 70 of each analyzer 66, and the corresponding template 74. The content builder 72 merges the result 70 with the template 74 to generate a formatted result 76 (FIG. 3, block 202). The content builder 72 identifies the predetermined set of tags 50 associated with the template 74, and associates the predetermined set of tags 50 with the formatted result 76 (FIG. 3, blocks 204-206).

Figure 4:
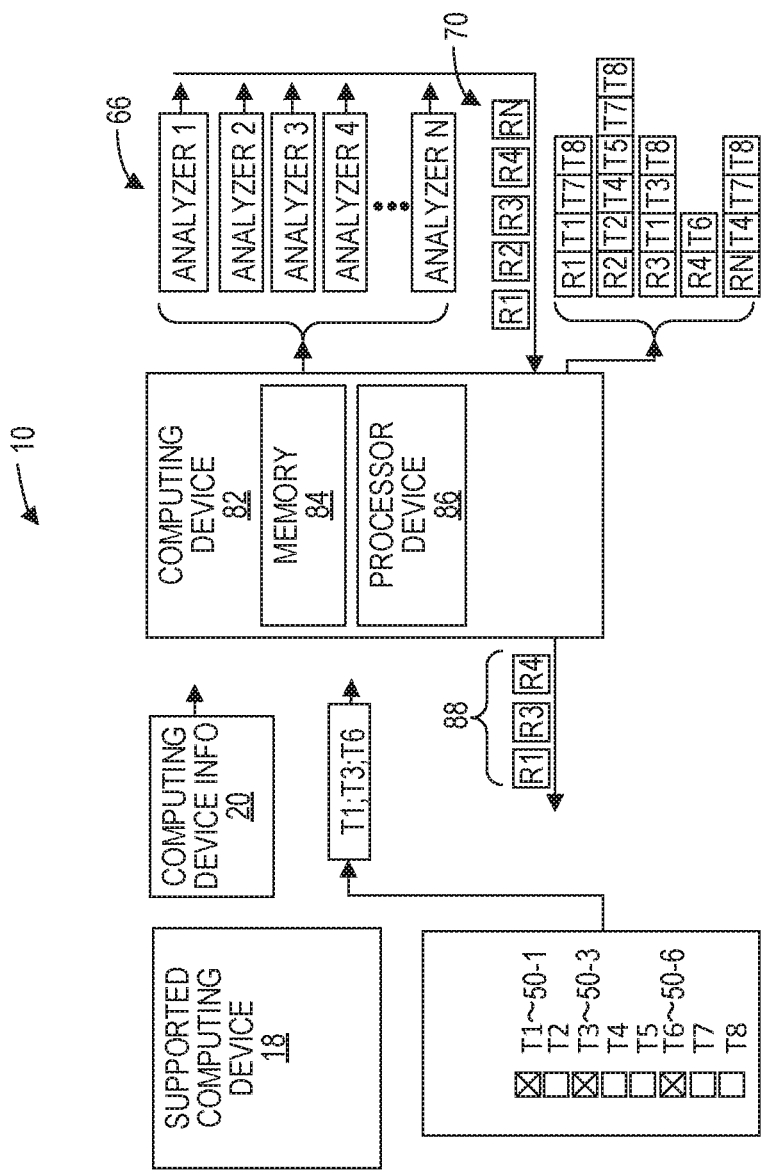
FIG. 4 is a block diagram of the environment illustrated in FIG. 1 according to another example.

FIG. 4 is a block diagram of the environment 10 according to another example. In this example, the analysis engine 38 (FIG. 1) is a processing component of a computing device 82. The computing device 82 includes a memory 84 and a processor device 86. The processor device 86 is coupled to the memory 84 and is to receive the computing device information 20 about the supported computing device 18 in which the problem was encountered. The processor device 86 is further to receive identification of a designated subset of tags 50-1, 50-3, and 50-6, and to initiate the plurality of analyzers 66 to analyze the computing device information 20. The plurality of analyzers 66 is configured to generate a plurality of results 70 based on the computing device information 20. The processor device 86 associates tags 50 of the plurality of tags 50 with the plurality of results 70. The processor device 86 generates a subset 88 of results 70 by discarding each result 70 from the plurality of results 70 that have no associated tags 50 that match a tag 50 in the designated subset of tags 50.

Figure 5:
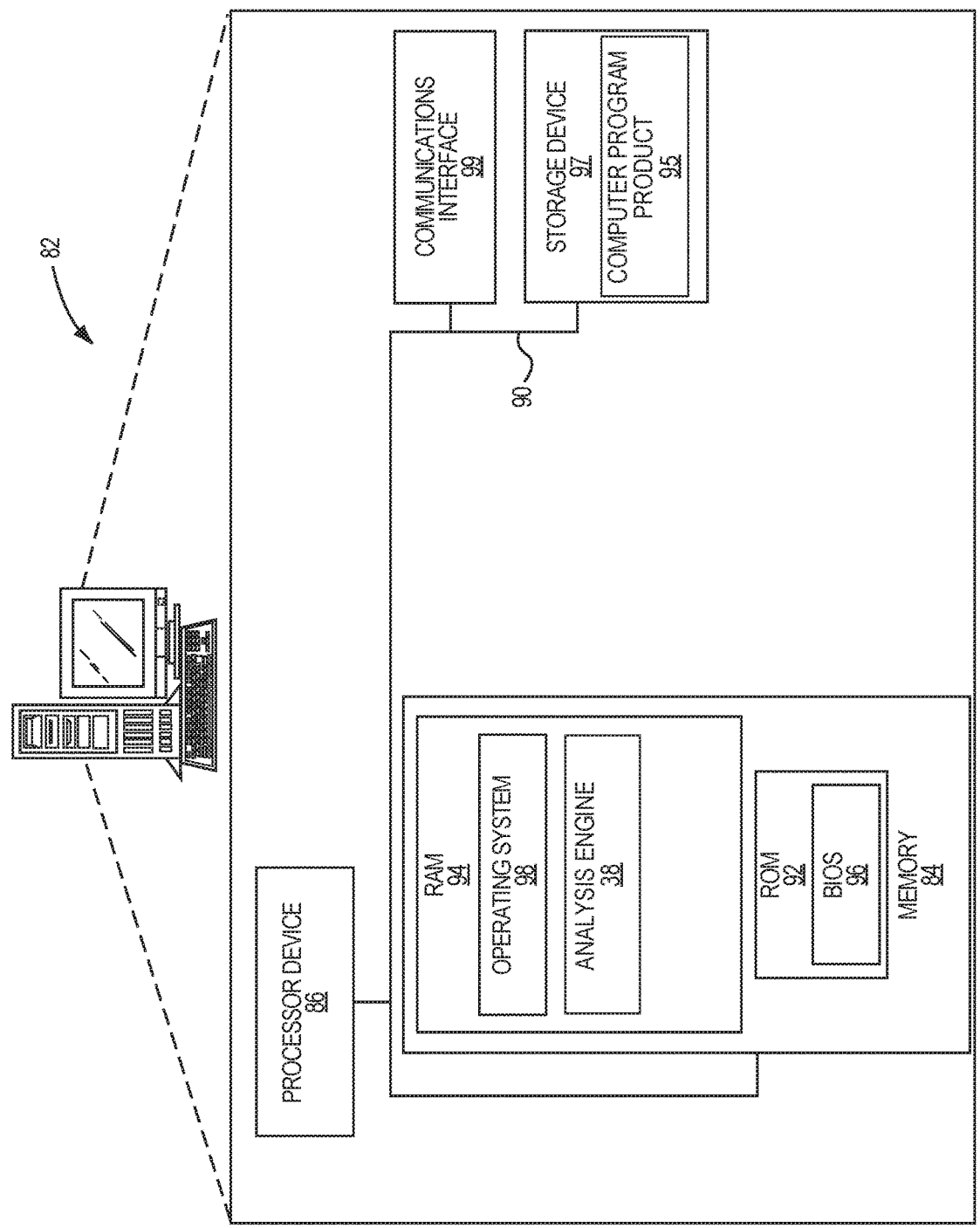
FIG. 5 is a block diagram of a computing device suitable for implementing examples according to one example.

FIG. 5 is a block diagram of the computing device 82 suitable for implementing examples according to one example. The computing device 82 may comprise any computing or electronic device capable of including firmware, hardware, and/or executing software instructions to implement the functionality described herein, such as a computer server, a desktop computing device, a laptop computing device, or the like. The computing device 82 includes the processor device 86, the system memory 84, and a system bus 90. The system bus 90 provides an interface for system components including, but not limited to, the system memory 84 and the processor device 86. The processor device 86 can be any commercially available or proprietary processor.

The system bus 90 may be any of several types of bus structures that may further interconnect to a memory bus (with or without a memory controller), a peripheral bus, and/or a local bus using any of a variety of commercially available bus architectures. The system memory 84 may include non-volatile memory 92 (e.g., read-only memory (ROM), erasable programmable read-only memory (EPROM), electrically erasable programmable read-only memory (EEPROM), etc.), and volatile memory 94 (e.g., random-access memory (RAM)). A basic input/output system (BIOS) 96 may be stored in the non-volatile memory 92 and can include the basic routines that help to transfer information between elements within the computing device 82. The volatile memory 94 may also include a high-speed RAM, such as static RAM, for caching data.

The computing device 82 may further include or be coupled to a non-transitory computer-readable storage medium such as a storage device 97, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 97 and other drives associated with computer-readable media and computer-usable media may provide non-volatile storage of data, data structures, computer-executable instructions, and the like. Although the description of computer-readable media above refers to an HDD, it should be appreciated that other types of media that are readable by a computer, such as Zip disks, magnetic cassettes, flash memory cards, cartridges, and the like, may also be used in the operating environment, and, further, that any such media may contain computer-executable instructions for performing novel methods of the disclosed examples.

A number of modules can be stored in the storage device 97 and in the volatile memory 94, including an operating system 98 and one or more program modules, such as the analysis engine 38, which may implement the functionality described herein in whole or in part. It is to be appreciated that the examples can be implemented with various commercially available operating systems 98 or combinations of operating systems 98.

A number of modules can be stored in the storage device 97 and in the volatile memory 94, including, by way of non-limiting example, the analysis engine 38. All or a portion of the examples may be implemented as a computer program product 95 stored on a transitory or non-transitory computer-usable or computer-readable storage medium, such as the storage device 97, which includes complex programming instructions, such as complex computer-readable program code, to cause the processor device 86 to carry out the steps described herein. Thus, the computer-readable program code can comprise software instructions for implementing the functionality of the examples described herein when executed on the processor device 86. The processor device 86, in conjunction with the analysis engine 38 in the volatile memory 94, may serve as a controller, or control system, for the computing device 82 that is to implement the functionality described herein.

An operator, such as the user 48, may also be able to enter one or more configuration commands through a keyboard (not illustrated), a pointing device such as a mouse (not illustrated), or a touch-sensitive surface. Such input devices may be connected to the processor device 86 through an input device interface that is coupled to the system bus 90 but can be connected by other interfaces such as a parallel port, an Institute of Electrical and Electronic Engineers (IEEE) 1394 serial port, a Universal Serial Bus (USB) port, an IR interface, and the like.

The computing device 82 may also include a communications interface 99 suitable for communicating with the network(s) 16 as appropriate or desired. The computing device 82 may also include a video port configured to interface with the display device 44, to provide information to the user 48.

Individuals will recognize improvements and modifications to the preferred examples of the disclosure. All such improvements and modifications are considered within the scope of the concepts disclosed herein and the claims that follow.

What is claimed is:

1. A method comprising:
receiving, by a computing device comprising a processor device over a network, computing device information about a supported computing device in which a problem was encountered;
receiving identification of a designated subset of tags of a plurality of tags;
generating, by at least one process executed by the computing device, a plurality of results based on an analysis of the computing device information;
associating tags of the plurality of tags with the plurality of results by applying templates to the plurality of results to generate a corresponding plurality of formatted results, each template including a predetermined set of tags associated with a respective corresponding formatted result;
generating a subset of formatted results by discarding each formatted result from the plurality of formatted results that has no associated tags that match a tag in the designated subset of tags; and
outputting the subset of formatted results.

2. The method of claim 1 further comprising:
analyzing the computing device information; and
automatically identifying a set of tags based on analyzing the computing device information; and
wherein the plurality of tags includes the set of tags.

3. The method of claim 1 further comprising:
causing presentation of a user interface on a display device that depicts each tag of the plurality of tags; and
receiving user input that identifies the designated subset of tags.

4. The method of claim 1 wherein applying the templates to the plurality of results further comprises, for each result:
determining a template that corresponds to the result;
merging the result with the template to generate a formatted result;
identifying the predetermined set of tags associated with the template; and
associating the predetermined set of tags with the formatted result.

5. The method of claim 1 further comprising:
accessing a mapper that contains a plurality of predetermined subject fields;
accessing the computing device information;
automatically analyzing the computing device information to identify values for at least some of the predetermined subject fields; and
modifying the mapper to include values for the at least some of the predetermined subject fields.

6. The method of claim 1 wherein generating the subset of formatted results comprises:
determining, for each formatted result of the plurality of formatted results, whether any tag of the tags associated with the formatted result match any tag in the designated subset of tags; and
discarding each formatted result that has no associated tag that matches a tag in the designated subset of tags.

7. The method of claim 1 wherein outputting the subset of formatted results comprises causing presentation of the subset of formatted results on a display device.

8. The method of claim 1 wherein receiving the computing device information comprises receiving system information that identifies memory, processor, and version attributes associated with a running environment of the computing device information.

9. A computing device, comprising:
a memory; and
a processor device coupled to the memory to:
receive over a network computing device information about a supported computing device in which a problem was encountered;
receive identification of a designated subset of tags of a plurality of tags, each tag of the plurality of tags comprising a predetermined data descriptor;
generate, by at least one process executed by the computing device, a plurality of results based on an analysis of the computing device information;
associate tags of the plurality of tags with the plurality of results by applying templates to the plurality of results to generate a corresponding plurality of formatted results, each template including a predetermined set of tags associated with a respective corresponding formatted result;
generate a subset of formatted results by discarding each formatted result that has no associated tags that match a tag in the designated subset of tags; and
output the subset of formatted results.

10. The computing device of claim 9 wherein the processor device is further to:
  analyze the computing device information; and
  automatically identify a set of tags based on analyzing the computing device information, and wherein the plurality of tags includes the set of tags.

11. The computing device of claim 9 wherein to apply the templates to the plurality of results the processor device is further to, for each result:
  determine a template that corresponds to the result;
  merge the result with the template to generate a formatted result;
  identify the predetermined set of tags associated with the template; and
  associate the predetermined set of tags with the formatted result.

12. The computing device of claim 9 wherein to generate the subset of formatted results the processor device is further to:
  determine, for each formatted result of the plurality of formatted results, whether any tag of the tags associated with the formatted result match any tag in the designated subset of tags; and
  discard each formatted result that has no associated tag that matches a tag in the designated subset of tags.

13. A computer program product stored on a non-transitory computer- readable storage medium and including instructions to cause a processor device to:
  receive over a network computing device information about a supported computing device in which a problem was encountered;
  receive identification of a designated subset of tags of a plurality of tags;
  generate, by at least one process executed by the computing device, a plurality of results based on an analysis of the computing device information;
  associate tags of the plurality of tags with the plurality of results by applying templates to the plurality of results to generate a corresponding plurality of formatted results, each template including a predetermined set of tags associated with a respective corresponding formatted result;
  generate a subset of formatted results by discarding each formatted result from the plurality of formatted results that has no associated tags that match a tag in the designated subset of tags; and
  output the subset of formatted results.

14. The computer program product of claim 13 wherein the instructions further cause the processor device to:
  analyze the computing device information; and
  automatically identify a set of tags based on analyzing the computing device information, and wherein the plurality of tags includes the set of tags.

15. The computer program product of claim 13 wherein to apply the templates to the plurality of results the instructions further cause the processor device to, for each result:
  determine a template that corresponds to the result;
  merge the result with the template to generate a formatted result;
  identify the predetermined set of tags associated with the template; and
  associate the predetermined set of tags with the formatted result.

16. The computer program product of claim 13 wherein to generate the subset of formatted results the instructions further cause the processor device to:
  determine, for each formatted result of the plurality of formatted results, whether any tag of the tags associated with the formatted result match any tag in the designated subset of tags; and
  discard each formatted result that has no associated tag that matches a tag in the designated subset of tags.

* * * * *